United States Patent [19]

Miki et al.

[11] Patent Number: 4,669,565

[45] Date of Patent: Jun. 2, 1987

[54] AGRICULTURAL TRACTOR WITH A DRIVER'S CABIN

[75] Inventors: Hiroyuki Miki; Yasuo Nakata; Kazuo Hirata; Seiichi Ishiizumi, all of Sakai; Genichi Funabashi, Sennan, all of Japan

[73] Assignee: Kubota, Ltd., Osaka, Japan

[21] Appl. No.: 681,517

[22] Filed: Dec. 14, 1984

[51] Int. Cl.$^4$ ............................................. B62D 33/06
[52] U.S. Cl. ................................ 180/89.12; 280/756; 296/190
[58] Field of Search ........................... 180/89.12, 89.1; 280/756; 296/190

[56] References Cited

U.S. PATENT DOCUMENTS 3,450,430  6/1969  Wendt et al. ...................... 280/756
4,049,294  9/1977  Atherton ............................ 280/756

FOREIGN PATENT DOCUMENTS 1467167  3/1977  United Kingdom ............... 296/190

Primary Examiner—John J. Love
Assistant Examiner—Ross Weaver
Attorney, Agent, or Firm—Jordan and Hamburg

[57] ABSTRACT

An agricultural tractor with a driver's cabin, in which the cabin is supported by a safety frame which is in turn supported by an axle case.

1 Claim, 8 Drawing Figures

AGRICULTURAL TRACTOR WITH A DRIVER'S CABIN

BACKGROUND OF THE INVENTION

This invention relates to an agricultural tractor with a driver's cabin.

Recent agricultural tractors are often provided with a driver's cabin to protect the driver from the sun and rain. An example of such agricultural tractors according to the prior art is disclosed in a Japanese utility model application laid open under No. 57-101614. This tractor comprises a driver's cabin including an windshield, a rear glass portion and a top wall. This cabin, which is an integral formation of synthetic resin, is connected by means of bolts to foot covers of a driver's section and to upper faces of rear fenders.

Although such a driver's cabin serves the purpose of protecting the driver from the sun and rain, it does not serve as a safety frame when the tractor turns over. This prior art cabin of plastic resin hardly has a sufficient strength to withstand shocks of the tractor's overturn. Besides, the cabin is supported by the foot covers and rear fenders which themselves are not very strong.

SUMMARY OF THE INVENTION

Having regard to the drawback of the prior art noted above, this invention intends to provide an agricultural tractor comprising a driver's cabin serving not only as a protection against the sun and rain but also as a safety frame.

The agricultural tractor having a driver's cabin according to this invention comprises a transmission, a rear axle case connected to the transmission, safety frame struts having base ends secured to the rear axle case, a safety frame having a U-shaped configuration in front view and having base ends connected to the safety frame struts, and a driver's cabin including right and left rear frame portions supported by the safety frame.

Thus, the safety frame rigidly supported by the axle case through the safety frame struts provides a good protection for the driver. The driver's cabin attached to the rigidly supported safety frame has an increased strength, and this cabin itself too provides a protection for the driver when the tractor turns over. The invention therefore has the advantage of protecting the driver not only from the sun and rain but also when the tractor turns over.

Other advantages of this invention will be apparent from the following description.

BRIEF DESCRIPTION OF THE DRAWINGS

The drawings show an agricultural tractor embodying this invention, in which.

DESCRIPTION OF THE PREFERRED EMBODIMENTS

Figure 2:
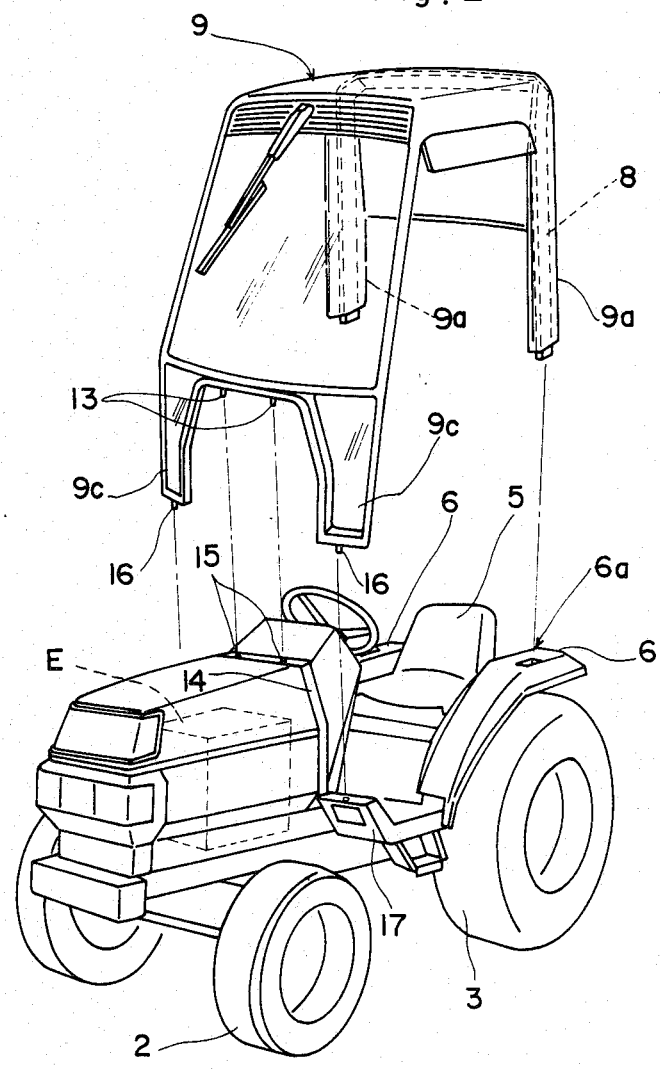
FIG. 2 is a perspective view of the tractor.

Referring to FIG. 2, an agricultural tractor according to this invention is the four wheel drive type comprising an engine E mounted at a front part of the tractor and a transmission 1 for transmitting output of the engine E to front wheels 2 and rear wheels 3.

Figure 1:
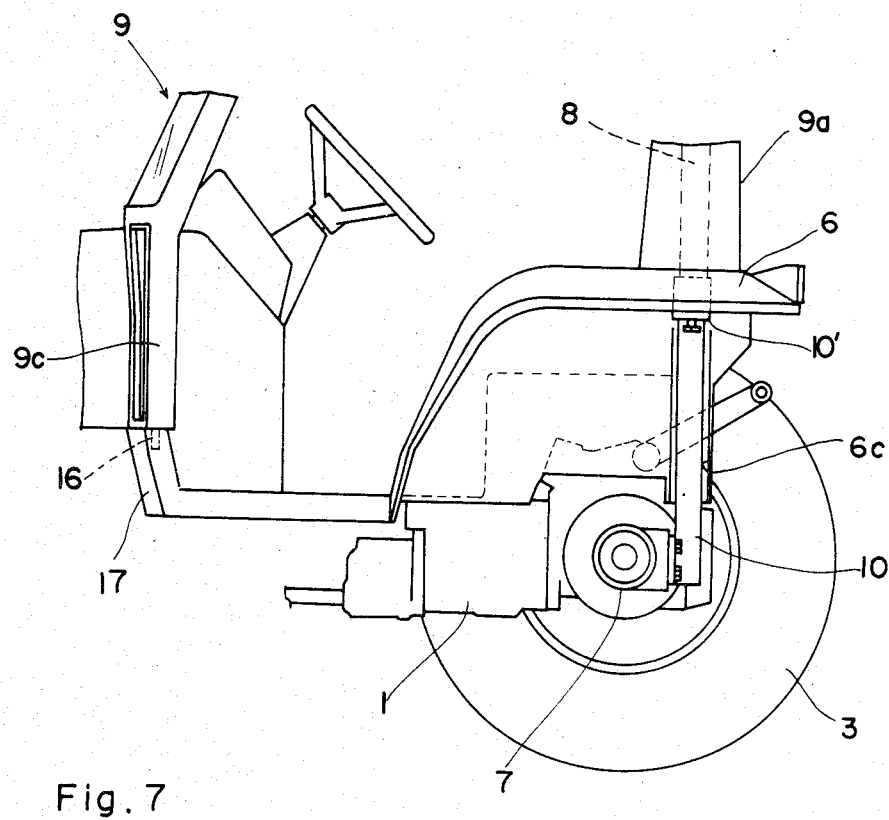
FIG. 1 is partly broken away side view of a principal part of the tractor.

The tractor further comprises a driver's seat 5 disposed between right and left fenders 6 of the rear wheels 3. As shown in FIG. 1, each of the fenders 6 is connected at a base end to a rear axle case 7. Number 8 denotes a safety frame for protecting the driver. In this embodiment the safety frame 8 supports a driver's cabin 9 and has a substantially U-shaped configuration in front view. Number 10 denotes safety frame struts including attaching elements 10' at upper ends thereof to support base ends 8' of the safety frame 8, respectively.

Figure 7:
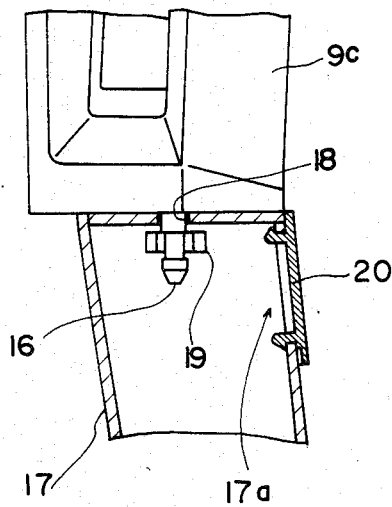
FIG. 7 is a view partly in section showing how a front leg portion of the driver's cabin is attached to a foot cover.
Figure 4:
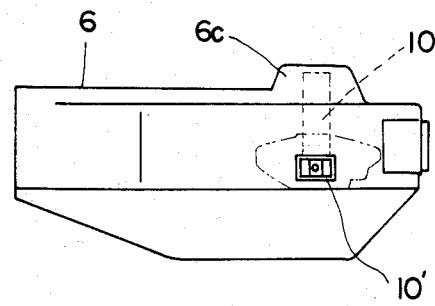
FIG. 4 is a plan view of a rear wheel fender.
Figure 6:
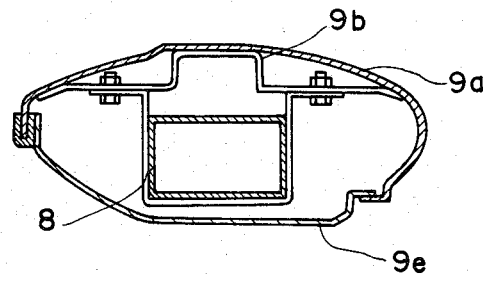
FIG. 6 is a cross section of a safety frame and a rear frame of a driver's cabin.
Figure 3:
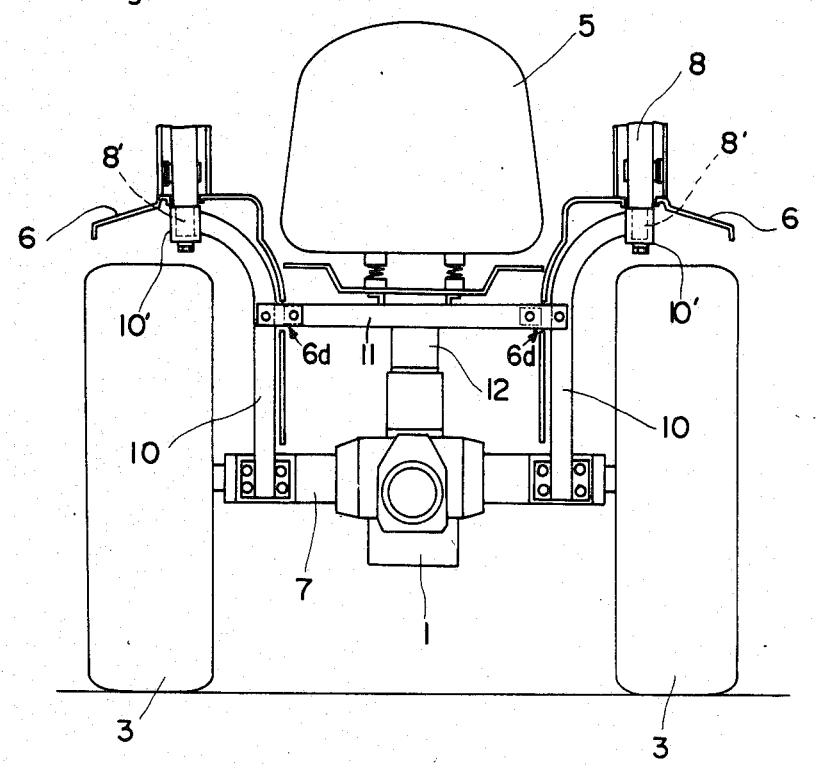
FIG. 3 is a rear view of the principal part.
Figure 5:
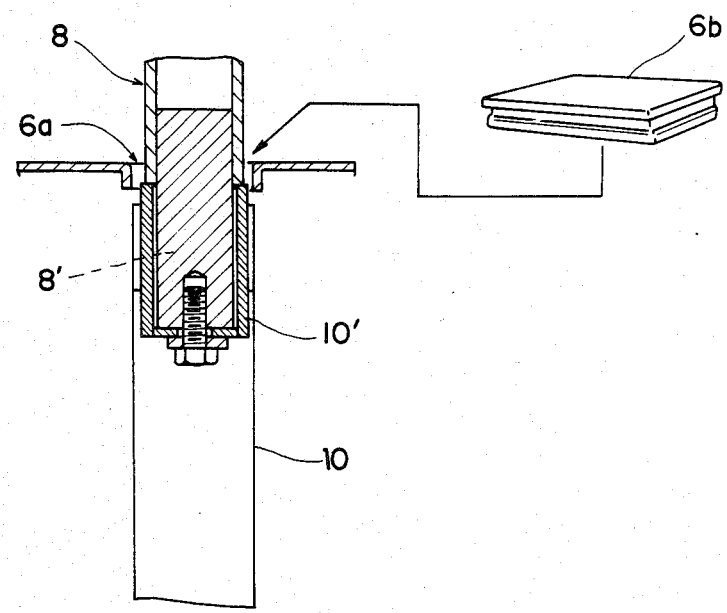
FIG. 5 is an enlarged front view in vertical section of a safety frame attaching structure.

These safety frame struts 10 have base ends thereof secured by bolts to the rear wheel axle case 7 and extend upwardly stopping slightly short of upper faces of the fenders 6. The attaching elements 10' are located at the upper ends of the safety frame struts 10. The upper faces of the fenders 6 each define an opening 6a through which the base end 8' of the safety frame 8 extends to be bolted to the attaching element 10' as shown in FIG. 5. The opening 6a is closed by a cap 6b when out of use. Each of the fenders 6 has a side face opposed to the rear wheel 3 defining a vertically extending recess 6c surrounding the safety frame strut 10 (FIGS. 1 and 4). This recess 6c has an approximately channel-shaped cross section. An opening 6d is defined in a vertically intermediate position of the recess 6c. A reinforcing stay 11 is provided to extend through the openings 6d and interconnecting the two safety frame struts 10. The stay 11 is located rearwardly and downwardly of the driver's seat 5 and, together with the safety frame struts 10, forms an approximately H-shaped configuration as viewed from the rear of the tractor. A cover plate 12 is welded to an intermediate position of the stay 11 transversely of the tractor, which cover plate 12 has a bottom bolted to a top portion of a case housing the transmission 1. Thus, the stay 11 and the right and left safety frame struts 10 are rigidly supported by a three-point support provided by the transmission case and the rear axle case 7. As shown in FIG. 6, the driver's cabin 9 includes right and left rear frame portions 9a each having a flange 9b connected to the safety frame 8 by means of bolts. Number 9e denotes a facing cover fitted to each of the rear frame portions 9a. The driver's cabin 9 has a lower front portion shaped in a gate-like form whose upper horizontal portion includes engaging pins 13 fitted into bores 15 defined in a gate-shaped frame 14 provided at a rear of an engine room. Legs 9c of the gate-like lower front portion of the cabin 9 include an engaging pin 16 into a bore 18 defined in an upper end of a foot cover 17 and held in position by a clip 19, as shown in FIG. 7.

The clip 19 is attached or detached through an opening 17a defined in a side wall of the foot cover 17. The opening 17a is closed by a cap as shown.

In short, the described embodiment comprises the fenders of the right and left rear wheels including the vertically extending grooves integral therewith and having an approximately channel-shaped cross section on side faces opposed to the rear wheels, and the safety frame struts secured at base ends thereof to the rear axle case and extending along the channel-shaped grooves to positions close to the upper faces of the fenders with the safety frame attaching elements mounted at upper ends thereof, respectively, the fenders including openings in the upper faces thereof to receive the base ends of the safety frame, respectively.

In this construction the fenders and the safety frame struts are arranged to overlap each other in the right and left direction, which permits the struts to be connected to the axle case at positions closer to the lateral sides of the tractor than in the prior art in which the struts are provided to extend upwardly at positions closer to the center of the tractor than are the fenders. These struts are provided to extend upwardly along inside of the upwardly extending grooves having an approximately channel-shaped cross section defined in the side faces of the fenders opposed to the rear wheels.

Therefore, a sufficient space is provided for mounting the driver's seat between the right and left fenders, and also various hand levers may readily be mounted between the driver's seat and the fenders. This permits the driver to operate the tractor comfortably. At the same time the channel-shaped grooves defined in the fenders to receive the safety frame struts act as vertically extending rib projections of the fenders, which has the advantage of reinforcing the fenders per se.

Figure 8:
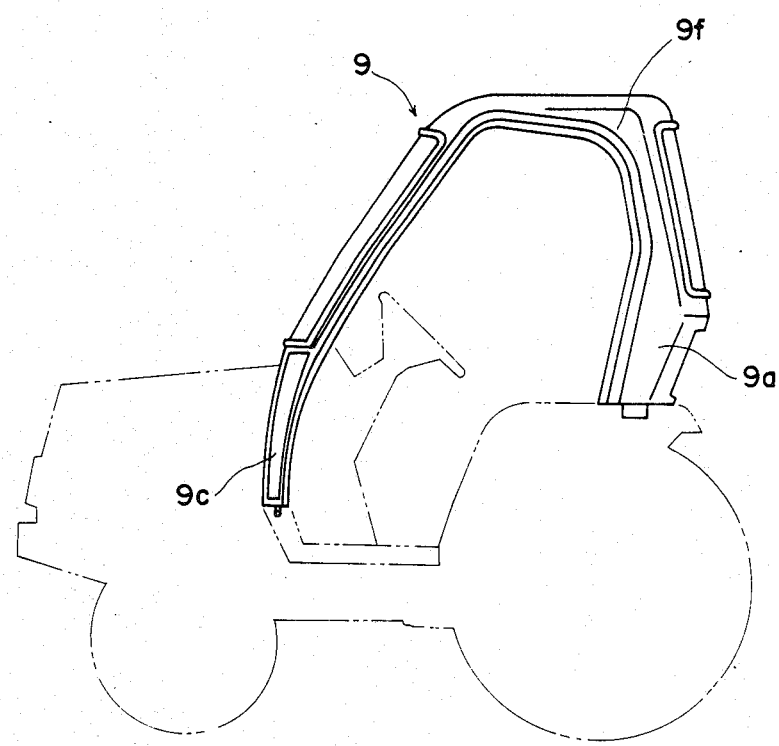
FIG. 8 is a side view of a modified driver's cabin.

FIG. 8 shows a modified driver's cabin which includes upper edges 9f inclined progressively downwardly toward the rear of the tractor in order to minimize rain entering sideways and falling on the driver.

We claim:

1. An agricultural tractor with a driver's cabin comprising:

a tractor body including foot covers at side portions thereof, each foot cover having a bore therein, driving means including a transmission with a transmission case, a rear axle connected to the transmission, rear wheels connected to the rear axle and a rear axle case connected to the transmission case for covering the rear axle, fenders connected to the rear axle case, each fender extending upwardly from the rear axle case and laterally outwardly relative to the transmission for substantially covering an upper portion of the rear wheel and including a groove extending vertically along a side of the fender, and upper and side holes communicating the groove, safety frame struts connected to the rear axle case, each strut extending upwardly along the inside of the groove of the fender.

a reinforcing device connected to the transmission case, said reinforcing device having a stay extending through the side holes of the fenders and connected to the safety frame struts so that the struts can be securely fixed to the tractor, and a driver's cabin including a safety frame with base ends at a rear portion thereof, said driver's cabin further including rear frame portions securely connected to the safety frame, each safety frame extending through the upper hole of the fender and securely fixed to the safety frame strut at the base end thereof, and legs formed at a front lower portion of the cabin, each leg having a first pin and an engaging device engaging the first pin, said first pin being inserted into the bore of the foot cover and engaging the engaging device so that the driver's cabin can be securely connected at the front lower portion to the tractor body and at the rear portion to the safety frame struts, said driver's cabin further including second pins engaging the tractor body so that the front portion of the driver's cabin can be securely attached to the tractor body.

* * * * *